United States Patent [19]

Sandberg et al.

[11] 3,726,980
[45] Apr. 10, 1973

[54] PHARMACEUTICAL PREPARATIONS CONTAINING ANILIDES OF QUINUCLIDINE-2- AND QUINUC LIDINE-3-CARBOXYLIC ACID AND METHODS FOR USING THEM

[76] Inventors: Rune Verner Sandberg, Badstigen 10, Jarna; Berndt Olof Harald Sjoberg, Kummelvagen 24, Sodertalje; Claes Philip Tegner, deceased, late of Hovslagarvagen 21, Sodertalje, Sweden by Gunnel Margareta Tegner, heiress

[22] Filed: Oct. 26, 1970

[21] Appl. No.: 84,142

Related U.S. Application Data

[63] Continuation-in-part of Ser. No. 729,947, May 17, 1968, Pat. No. 3,579,523.

[30] Foreign Application Priority Data

May 23, 1967  Sweden ........................... 7251/67

[52] U.S. Cl. ................................................. 424/267
[51] Int. Cl. ................................................ A61k 27/00
[58] Field of Search ........................................ 424/267

[56] References Cited

UNITED STATES PATENTS

| 2,792,399 | 5/1957 | Thuressow et al. | 260/294 |
| 2,799,679 | 7/1957 | Thuressow et al. | 260/294 |

OTHER PUBLICATIONS

Chemical Abstracts 50:8644e (1956).
Chemical Abstracts 64:12642e (1966).

*Primary Examiner*—Jerome D. Goldberg
*Attorney*—Brumbaugh, Graves, Donohue & Raymond

[57] ABSTRACT

Pharmaceutical preparations containing anilides of quinuclidine-2- and quinuclidine-3-carboxylic acid of the formula

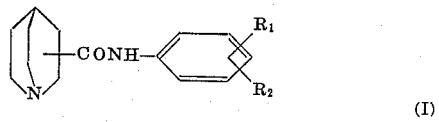

(I)

and their therapeutically acceptable acid addition salts, wherein $R_1$ and $R_2$ may be the same or different and represent hydrogen, halogen, or alkyl having at most three carbon atoms. These preparations are particularly useful in dosage form for anesthetizing animal tissue and in treating arrhythmia in animals, including man.

13 Claims, No Drawings

PHARMACEUTICAL PREPARATIONS CONTAINING ANILIDES OF QUINUCLIDINE-2- AND QUINUCLIDINE-3-CARBOXYLIC ACID AND METHODS FOR USING THEM

This is a continuation-in-part of copending application Ser. No. 729,947, filed May 17, 1968, now U.S. Pat. No. 3,579,523.

This invention relates to anilides of quinuclidine-2- and quinuclidine-3-carboxylic acid, their therapeutically acceptable salts, and pharmaceutical preparations thereof. The invention also relates to a method of anesthetizing animal tissue and treating arrhythmia in animals including man.

More particularly the present invention relates to pharmaceutical preparations containing compounds of the formula

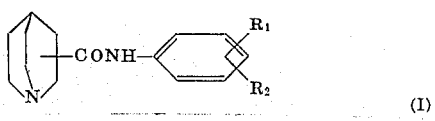

which are amides derived from quinuclidine-2- or quinuclidine-3-carboxylic acid, and wherein $R_1$ and $R_2$ may be the same or different and each represents a hydrogen or halogen atom or an alkyl group of at most three carbon atoms, to therapeutically acceptable salts thereof, and also to a method of using these compounds as local anesthetics and anti-arrhythmic agents.

An object of the present invention is to provide pharmaceutical compositions containing anilides of quinuclidine-2- and quinuclidine-3-carboxylic acid and salts thereof, which can be administered to animals including man to give local anesthetic and anti-arrhythmic effects.

According to the present invention the compounds of formula I are prepared by reacting a compound of the formula

or a salt thereof with a compound of the formula

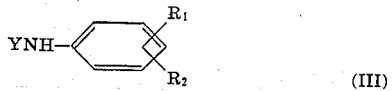

wherein $r_1$ and $R_2$ have the meaning given above, — COX is a carboxyl group or a reactive group derived therefrom bound in 2- or 3-position of the quinuclidine group and Y is hydrogen or an activating group such as Na, $CH_3MgI$ or

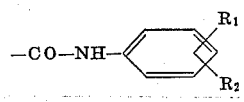

The compound of the formula II is a carboxylic acid, an acid chloride or its functional equivalent such as an acide bromide, an ester, an anhydride, a mixed anhydride, especially one formed with an alkoxy formid acid, or a derivative obtained by reaction between a carboxylic acid and a carbodiimide or other compounds functioning in the same way, such as $N,N_1$-carbonyl diimidazole or N-ethyl-5-phenyl isoxazolium-3'-sulphonate.

Where the anilide is required in the form of a therapeutically acceptable salt, the process may include the step of converting the base of the formula I into the desired salt by reacting with the appropriate acid.

The expression "therapeutically acceptable salt" is recognized in the art to designate an acid addition salt, which is physiologically innocuous when administered in dosage amounts and at an interval (e.g., frequency of administration) that is effective for the indicated therapeutic use of the parent compound. Typical therapeutically acceptable acid addition salts of the compounds of formula I include, but are not limited to, the salts of mineral acids such as hydrochloric, hydrobromic, phosphoric or sulphuric acid, and of organic acids such as lactic, levulinic, citric, fumaric, maleic, succinic, tartaric, benzoic acid, and sulphonic acids such as methane sulphonic acid and sulphamic acid.

Starting material of the formula II may be prepared in the following ways: Quinuclidine-2-carboxylic acid is prepared according to E. Renk et al. (Helv. Chim. Acta 37 (1954), 2119), and quinuclidine-3-carboxylic acid according to C.A. Grob and E. Renk (Helv. Chim. Acta 37 (1954), 1689), and the reactive derivatives of the above acids are prepared therefrom by methods known in the art.

As alternate methods of preparing the compounds according to the present invention, a lower alkyl ester of a quinuclidine carboxylic acid may be reacted with the Grignard reagent of the aniline compound or the anhydride of a quinuclidine carboxylic acid may be reacted with the aniline compound.

The present invention also pertains to a method of anesthetizing animal tissue and to a method of treating arrhythmia in animals including man by administering a therapeutically effective dose of a pharmaceutically acceptable anilide compound or salt thereof as previously defined by formula I. In clinical practice, the derivatives of the invention will normally be administered orally or by injection in the form of pharmaceutical preparations comprising the active ingredient in the form of the free base or one of the common therapeutically acceptable salts, e.g., the hydrochloride, in association with a pharmaceutically acceptable carrier. The carrier may be a solid, semi-solid or liquid diluent or an ingestible capsule. Usually the active substance will comprise between 0.1 percent and 85 percent by weight of the preparation, for example, between 0.5 percent and 5 percent for preparations intended for injection and between 2 percent and 50 percent for preparations intended for oral administration.

Pharmaceutical preparations in the form of dosage units for oral application containing a compound of the invention in the form of the free base or a pharmaceutically acceptable acid addition salt may be prepared in various ways. The compounds may be mixed with a solid, pulverulent carrier, for example lactose, saccharose, sorbitol, mannitol, starches such as potato starch, corn starch or amylopectin, cellulose derivatives, gelatin. The carrier may also be a lubricant such as magnesium or calcium stearate, a Carbowax or other polyethylene glycol wax compressed to form tablets or, preferably, cores which are then coated with a con-centrated sugar solution which may contain, e.g., gum arabic, gelatin, talcum and/or titanium dioxide. These cores may also be coated with a lacquer dissolved in a readily volatile organic solvent or mixture of organic solvents. Dyestuffs can be added to these coatings. By using several layers of the active drug, separated by slowly dissolving coatings, sustained release tablets are obtained. Another way of preparing sustained release tablets is to divide the dose of the active drug into granules with coatings of different thicknesses, and compress the granules into tablets together with the carrier substance. The active substance can also be incorporated in slowly dissolving tablets made, for example, of fat and wax substances, or evenly distributed in a tablet of an insoluble substance such as a physiologically inert plastic substance.

Soft gelatin capsules (pearl-shaped close capsules) and other closed capsules consist, for example, of a mixture of gelatin and glycerol, and contain, e.g., mixtures of the active substance with a vegetable oil, and hard gelatin capsules contain, for example, granulates of the active substance with solid, pulverulent carriers such as lactose, saccharose, sorbitol, mannitol; starches such as potato starch, corn starch or amylopectin; cellulose derivatives or gelatin, as well as magnesium stearate or stearic acid.

For parenteral application by injection the preparations of the invention advantageously comprise an aqueous solution of a water soluble, pharmaceutically acceptable salt of the active substance and optionally also a stabilizing agent and/or a buffer substance. Solutions intended for use in local anesthesia may be made isotonic, for example, by the addition of sodium chloride. As is known in the art of local anesthesia, the effectiveness of the anesthesia may be improved by addition of a vasoconstrictor such as adrenaline, noradrenaline or octapressin.

The compounds according to the present invention have been found to exhibit both strong local anesthetic and anti-arrhythmic activity. The following examples report several experiments which illustrate the local anesthetic and anti-arrhythmic effects of the compounds according to the present invention.

LOCAL ANESTHETIC EFFECTS

EXAMPLE I

The screening procedure for local anesthetic activity used for these experiments consists of the standard two step technique. First, the compounds were tested for isolated frog sciatic nerve block by the following procedure:

The sciatic peroneal nerve, including the tibial branch, was dissected out and mounted on Ag/AgCl electrodes in a nerve chamber (room temperature and constant humidity). A portion of the nerve between the proximal stimulating and distal recording electrodes was immersed in a bath (5 ml) containing the test compound dissolved in Tasaki frog Ringer (pH 7.4). The reduction in the amplitude of the A-spike of the action potential was recorded against time following supramaximal stimulation (30/s) for about 5 seconds, at first every minute while bathing in the solution and then at regular intervals while washing out the local anesthetic with the Ringer solution. The washing was automatic and performed at a constant rate. In the preliminary screening the nerve was immersed for 5 minutes and then washed. The effects (depth of block, relative duration) produced by equimolar concentrations (5 mM) of test compound and lidocaine, the reference compound, were compared on the same nerve and the effect of test relative to reference was calculated.

The compounds were then tested for topical anesthesia on rabbit cornea by the following procedure:

0.25 ml of the solutions (test compound and reference) were applied to the conjunctival sac for 30 seconds. The drugs were tested on the same animals, but on different eyes. Latency, duration of anesthesia and frequency of block was observed using a graphite point as a stimulator. The effects of some varying concentrations of test compound were compared to that of a constant concentration of reference drug.

The results are reported in Table 1:

TABLE 1

LOCAL ANESTHETIC ACTIVITY

Compound of formula I

| $R_1$ | $R_2$ | Positional isomer | Isolated frog sciatic nerve block | Rabbit cornea |
|---|---|---|---|---|
| Lidocaine | | (Reference compound) | 1 | 1 |
| 2-$CH_3$ | H | 2 | 0.3 | 0.2 |
| 2-$CH_3$ | 6-$CH_3$ | 2 | 1 | 0.9 |
| 2-$CH_3$ | 6-$C_2H_5$ | 2 | 0.8 | 1.5 |
| 2-$C_2H_5$ | 6-$C_2H_5$ | 2 | 1.1 | — |
| 2-Cl | H | 2 | 0.2 | 0.3 |
| 2-Cl | H | 3 | 0.2 | 0.6 |

ANTI-ARRHYTHMIC ACTIVITY

EXAMPLE II

The compounds of the general formula were found to decrease excitability and prolong the refractory period and the conduction time in the atria of guinea pigs. The results of this experiment are given in Table 2 where the concentrations producing 50 percent increase in refractory and conducting time for the test compounds relative to lidocaine as the reference substance are reported:

TABLE 2

Relative concentrations producing 50 percent increase in refractory period and conduction time

| Compound (positional isomer:2) $R_1$ | $R_2$ | Threshold | Refractory period | Conduction time |
|---|---|---|---|---|
| Lidocaine | | 1.00 | 1.00 | 1.00 |
| 2-$CH_3$ | 6-$CH_3$ | 0.50 | 0.50 | 0.50 |
| 2-$CH_3$ | 6-$CH_2H_5$ | 0.50 | 0.15 | 0.25 |
| 2-$C_2H_5$ | 6-$C_2H_5$ | 0.25 | 0.25 | 0.15 |

EXAMPLE III

Experiments were conducted with quinuclidine-2-carboxylic acid 2-methyl-6-ethylanilide hydrochloride (hereinafter RAC 136) on in vivo arrhythmias arising from (1) coronary infarction, (2) acute digitalis intoxication, and (3) from the effect on isoprenalin-induced ventricular automaticity in the AV block dog. The technique used for these experiments is quite well-known in the study of anti-arrhythmic drugs and is reported in detail in Harris, "Delayed Development of Ventricular Ectopic Rhythms Following Experimental Coronary Occlusion," Circulation 13 18–28 (1950).

1. The Coronary Dog 8 hours following a two-stage ligation of the descending branch of the left coronary artery, arrhythmias occurred in the dogs which persisted 2 to 4 days when left untreated. This arrhythmia is etiologically similar to that observed following acute myocardial infarction in man and is mainly a multifocal ventricular tachycardia. Three coronary dogs were used in this study on the second post occlusion day when ventricular ectopic incidence was still 70 percent – 80 percent of the total beats. RAB 136 was injected intravenously over 5 minutes in increasing doses at 30 minute intervals. The arrhythmia was considered cleared when all abnormal pacemaker activity had been abolished. No anesthesia or sedation was used. A 2 percent aqueous solution of the drug was prepared on the day of the experiment.

Three experiments were carried out with RAB 136 and the results are reported below in Table 3. Doses of 1.0 mg/kg and 2.0 mg/kg briefly reduced the ventricular ectopic frequency and complete clearing was observed immediately after 4.0 mg/kg in each dog. The duration of the anti-arrhythmic effect appeared to be prolonged although two of the experiments were terminated before the return of ectopic beats.

ventricular tachycardia with a return to sinus rhythm. The drug was considered ineffective if the tachycardia still persisted 30 minutes after administration. The ouabain used in the experiments was in ampuls of 0.25 mg/ml and aqueous solutions of RAB 136 hydrochloride were prepared on the day of the experiment.

One dog was treated with 1.0 mg/kg of RAB 136 with no resultant effect on the arrhythmia. A complete series of six experiments was then carried out with 2.0 mg/kg using this dog (5 days later) and five others. The ventricular tachycardia was effectively suppressed in all but one instance. The duration of anti-arrhythmic activity was about 5 minutes in three dogs and over 90 minutes in the other two effective cases. The heart rate during clearing was lower than the pre-ouabain values in four out of five experiments, but the values did not fall below 60 beats per minute. Table 4 summarizes the results of these experiments.

TABLE 4

The Effect of RAB 136 Hydrochloride on Ouabain-induced Ventricular Tachycardia in the Unanesthetized Dog

| Dog No. | Intra-venous dose (mg./kg.) | Cumul-ouabain dose (μg./kg.) | Heart frequency beats/min.+ | | | Effect on arrhythmia | |
|---|---|---|---|---|---|---|---|
| | | | Just before ouabain | Tachycardia before treatment | Lowest after clearing | Onset of clearing | Duration clearing |
| 118 | 1.0 | 60 | 129 | 228 | | No effect | |
| 39 | 2.0 | 70 | 72 | 204 | | No effect | |
| Flo | 2.0 | 60 | 87 | 165 | 69 | Immed. | 7 min. |
| Rak | 2.0 | 60 | 150 | 204 | 96 | Immed. | 4 min. |
| 58 | 2.0 | 70 | 54 | 174 | 126 | Immed. | 4 min. |
| 118 | 2.0 | 60 | 102 | 225 | ++81 | Immed. | >90 min. |
| 159 | 2.0 | 70 | 93 | 228 | ++60 | Immed. | >90 min. |

+=Extrapolated from 20 seconds.
++=During first 30 minutes of clearing.

3. Isoprenalin-Accelerated Ventricular Automaticity in the AV Block Dog

Ventricular automatism is involved in many clinical arrhythmias. Isoprenalin accelerates ventricular automaticity and this can be easily observed in dogs when the sinoatrial influence has been eliminated by complete AV block. RAB 136 was tested on four preparations which permitted evaluation of the effect of drugs on ventricular automation where the dogs were maintained on electronic pacemakers. The extent of idioventricular acceleration by rapid intravenous isoprenalin injections was first determined during 5-second interruptions of the pacekamer. RAB 136 was then injected intravenously over 5 minutes. The criteria for a positive effect was the abolishment of the ventricular response to isoprenalin. The response was checked again at the end of the drug injection and usually every 15 minutes thereafter for 3 to 4 hours.

TABLE 3

The Effect of Intravenous RAB 136 Hydrochloride on Unanesthetized Coronary Dog Arrhythmias on The Second Post Occlusion Day

| | Experiment 67166 | | | Experiment 671510 | | | Experiment 67152 | | |
|---|---|---|---|---|---|---|---|---|---|
| | Percent vent. ectopics | | Duration of effect (min.) | Percent vent. ectopics | | Duration of effect (min.) | Percent vent. ectopics | | Duration of effect (min.) |
| Dose (mg./kg.) | Before drug | At peak response | | Before drug | At peak response | | Before drug | At peak response | |
| 1.0 | 74 | 47 | 5 | 80 | 57 | 5 | | | |
| 2.0 | 71 | 9 | 5 | 96 | 45 | 5 | 62 | 4 | 5 |
| 4.0 | 51 | 0 | 10–20 | 61 | 0 | 20–30 | 68 | 0 | 20–30 |
| 6.4 | 20 | +0 | 20–30 | | | | | | |
| 8.0 | §14–60 | ++0 | >30 | 56 | +0 | 30–45 | 35 | 0 | >30 |
| 8.0 | | | | 55 | +0 | 45–60 | | | |

+=Convulsions.
++=Convulsions, respiratory embarrassment, −65% decrease syst. b.p. (brief).
§=Four hours from previous dose.

2. Digitalis-Induced Ventricular Tachycardia in the Awake Dog

Ventricular tachycardia occurs in the unanesthetized dog following 60 – 90 μg/kg of g-strophantin (ouabain) when given intravenously in divided doses over 1 to 2 hours. Tachycardia was established for 5 minutes so that it would persist uninterrupted for at least 90 minutes. Five minutes after the onset of the tachycardia, RAB 136 was injected intravenously over a 2 minutes period. Frequent EKG sampling enabled evaluation of the ventricular beats which were classified as either atrial or idioventricular in origin. Complete clearing was defined as abolishment of the Additional RAB 136 was often given at 30 to 60 minute intervals in an attempt to produce or prolong a positive effect. Aqueous solutions of 1-isoprenalin bitartrate and RAB 136 hydrochloride were prepared on the day of the experiment.

Table 5 summarizes the results of these experiments. The dose of RAB 136 that was required to surpress the ventricular acceleratory response to isoprenalin was 1.0 mg/kg in three out of four dogs and 4.0 mg/kg in one dog. The duration of action was about 15 minutes. In the three dogs which responded to the lower dose of RAB 136 an additional 2.0 mg/kg was given 1 hour later. The duration of the positive effect was thereby prolonged to approximately 30 minutes. A final dose of 4.0 mg/kg was injected 30 minutes to 1 hour afterwards in these three dogs. Although the duration of the positive effect could not be measured in one of the dogs due to technical problems, it appeared to be extended to well over 30 minutes in the other two animals. The isoprenalin-induced sinus tachycardia was apparently unaffected by RAB 136 in all of the experiments.

TABLE 5

The Effect of RAB 136 Hydrochloride on the Isoprenalin-Induced Acceleration of Ventricular Automaticity in the Unanesthetized Dog with Chronic Complete AV Heart Block.

| Experiment number | Dose of Intravenous RAB 136 Hydrochloride | | | |
|---|---|---|---|---|
| | 0.5 mg/kg | 1.0 mg/kg | 2.0 mg/kg | 4.0 mg/kg |
| 67153 | | | | |
| Effect on vent. response to ipr. | neg | pos | pos | pos |
| Duration of effect (min. | | 15 | 30 | ? |
| 67155 | | | | |
| Effect on vent. response to ipr. | neg | pos | pos | pos+ |
| Duration of effect (min) | | 15 | 30 | 30–90 |
| 67161 | | | | |
| Effect on vent. response to ipr. | neg | pos | pos | pos + |
| Duration of effect (min) | | 15 | 30–60 | 30–60 |
| 67165 | | | | |
| Effect on vent. response to ipr. | neg | neg | neg+ | pos+ |
| Duration of effect (min) | | | | 15 |

Effect pos = ventricular response to isoprenalin abolished.
+ = vomiting

EXAMPLE IV

The acute oral toxicity and antifibrillatory activity of quinuclidine-2-carboxylic acid 2,6-xylidide hydrochloride (hereinafter RAB 105 HCl), quinuclidine-2-carboxylic acid 2-methyl-6-ethylanilide hydrochloride (hereinafter RAB 136 HCl) and quinuclidine-2-carboxylic acid 2,6-diethylanilide (hereinafter RAB 138 HCl) were determined in mice to compare the antiarrhythmic activity of anilides of quinuclidine-2-carboxylic acid with that of known antiarrhythmic agents.

Charles River CD-1 strain (random-bred Albino, female) HaM/1CR (Hauschka and Mirand-Roswell Park Memorial Institute-Swiss) mice weighing between 18–25 gm. were used. All mice were fasted 16–23 hours prior to testing.

Aqueous solutions of the hydrochloride salts of RAB 105, RAB 136 and RAB 138 were prepared on the day of the experiments. The concentration of the solutions was varied so that the volume administered was 0.3–0.6 ml.

All mice were initially weighed and their EKG recorded. The $LD_{0.1}$ of the test drug was then given via an 18 gage needle and the mice placed in separate containers. Each animal was carefully observed for toxic symptoms. The EKG was recorded again after 5, 10, 20 and/or 40 minutes then the mice were individually chloroformed. 10 mice were used with each compound at each time period with 5 minute intervals between individual animal treatments.

Acute Oral Toxicity

Aqueous solutions of drugs were administered via an 18 gauge needle to groups of 10 mice in various doses equidistant on a log scale. The animals were observed at intervals for overt toxicity and mortality was recorded at 24 hours. Whenever animals were observed at the time of death, the thorax was opened and the heart activity recorded.

The $LD_{50}$ and 95 percent Fieller Confidence Limits (or 95 percent approximate limits were calculated by the Berkson method (Berkson, "Minimum Logit Chi Square Method," 48 J. Amer. Statist. Assoc. 565 (1953). The $LD_{1.0}$ and $LD_{0.1}$ were determined as described by Cornfield and Mantel in their article "-Modification of Karbers Method", 45 J. Amer. Statist. Assoc. 193 (1950).

The oral $LD_{50}$ and $LD_{0.1}$ of RAB 105, RAB 136 and RAB 138 are presented in Tables 6–8. All deaths occurred within 15 minutes after dosing. Deaths following RAB 105 and RAB 136 were preceded by convulsions and RAB 136 and RAB 138 by respiratory arrest. Postmortem thoracotomy revealed co-ordinated ventricular activity in all animals examined at the time of death. The $LD_{0.1}$ of each compound invariably produced ataxia which persisted 15 to 20 minutes. The absolute changes in ventricular rate which occurred 5 minutes after the $LD_{0.1}$ of RAB 138, 10 minutes after RAB 105, RAB 136, RAB 138, and 20 minutes after RAB 105 and RAB 138 were not significantly different from the changes observed in control groups of mice. The ventricular rates 20 minutes after RAB 136 were significantly lower than those of the controls (see Tables 9–12).

TABLE 6

Acute Oral Toxicity in Female Mice Fasted 16-23 Hours

Compound: Quinuclidine-2-carboxylic acid 2,6-xylidide hydrochloride (RAB 105 HCl)

| Dose (mg/kg as HCl) | Number of Mice | Lethality (24 Hours) | | |
|---|---|---|---|---|
| | | % | Onset (Mins) | Type of Death |
| 102 | 10 | 10 | <15 | Convulsive |
| 162 | 10 | 70 | <15 | Convulsive |
| 256 | 10 | 100 | <15 | Convulsive |

$LD_{50} = 141.2$
95% Fieller Lim: 108.1–176.9
$LD_{1.0} = 79.3$
$LD_{0.1} = 67.5$

TABLE 7

Acute Oral Toxicity in Female Mice Fasted 16-23 Hours

Compound: Quinuclidine-2-carboxylic acid 2-methyl-6-ethylanilide hydrochloride (RAB 136 HCl)

| Dose (mg/kg as HCl) | Number of Mice | Lethality (24 Hours) % | Onset (Mins) | Type of Death |
|---|---|---|---|---|
| 102 | 10 | 10 | <15 | Convulsive/Resp. arrest |
| 162 | 10 | 60 | <15 | Convulsive/Resp. arrest |
| 256 | 10 | 100 | <15 | Convulsive/Resp. arrest |

$LD_{50} = 150.9$
95% Fieller Lim: 116.8–189.5
$LD_{1.0} = 79.07$
$LD_{0.1} = 66.36$

TABLE 8

Acute Oral Toxicity in Female Mice Fasted 16–23 Hours

Compound: Quinuclidine-2-carboxylic acid 2,6-diethylanilide hydrochloride (RAB 138 HCl)

| Dose (mg/kg as HCl) | Number of Mice | Lethality (24 Hours) % | Onset (Mins) | Type of Death |
|---|---|---|---|---|
| 64.1 | 10 | 0 | <15 | Respiratory Arrest |
| 102.0 | 10 | 30 | <15 | Respiratory Arrest |
| 162.0 | 10 | 100 | <15 | Respiratory Arrest |

$LD_{50} = 118.1$
Approx. 95% Conf. Lim: 94.8–147.1
95% Fieller Lim: 91.6–155.3
$LD_{1.0} = 75.5$
$LD_{0.1} = 67.6$

Chloroform-induced Ventricular Fibrillation

Ventricular fibrillation was produced in mice according to the procedure developed by Lawson and described in his article entitled "Antiarrhythmic Activity of Some Isoquinoline Derivatives Determined by a Rapid Screening Procedure in the Mouse" 160 J. Pharmacol. Exp. Therap. 22–31 (1968). The mice were placed individually into a 2,000 ml beaker containing cotton and 50 ml of chloroform. Immediately after cessation of respiration, the mouse was removed from the beaker, the thorax opened and the heart examined for the presence or absence of ventricular fibrillation. The nature of the cardiac rhythm was then confirmed by electrocardiographic recordings. Whenever fibrillation was not evident, the heart was touched with forceps. The heart was considered as fibrillating if fine tremulous movements were present on the surface of the ventricle and persisted for at least 5 seconds after the thoracotomy or the mechanical stimulus. Ventricular fibrillation was considered absent in those animals in which coordinated ventricular activity was evident following such procedures.

The $LD_{0.1}$ of all three RAB compounds protected 60 percent or more of the mice from ventricular fibrillation when subjected to chloroform inhalation 10 minutes after oral treatment. Greater than 50 percent of the mice were protected 40 minutes after RAB 105, and 20 minutes after RAB 136. The results are reported in Tables 9–12.

TABLE 9

Effect of Oral Pretreatment on the Incidence of Ventricular Fibrillation Following Chloroform Inhalation in Fasted Female Mice

| Compound | Dose LD 0.1 (mg./kg.) | No. of mice | Mins. after dosing | Heart rate, b.p.m.±S.E. Before | Heart rate, b.p.m.±S.E. After | Protection from vent. fibrillation (percent) | Toxicity at time of chloroform inhalation Percent ataxic | Toxicity at time of chloroform inhalation Percent other toxicity |
|---|---|---|---|---|---|---|---|---|
| RAB 105 HCl | 67.5 | 10 | 10 | 410±69 | 478±24 | 80 | 100 | 0 |
|  | 67.5 | 10 | 20 | 518±68 | 502±27 | 40 | 100 | 0 |
|  | 67.5 | 10 | 40 | 462±79 | *500±17 | 55 | 0 | (a) |

*No statistical analysis.  a 1 death after 15 minutes.

TABLE 10

Effect of Oral Pretreatment on the Incidence of Ventricular Fibrillation Following Chloroform Inhalation in Fasted Female Mice

| Compound | Dose LD 0.1 (mg./kg.) | No. of mice | Mins. after dosing | Heart rate, b.p.m.±S.E. Before | Heart rate, b.p.m.±S.E. After | Protection from vent. fibrillation (percent) | Toxicity at time of chloroform inhalation Percent ataxic | Toxicity at time of chloroform inhalation Percent other toxicity |
|---|---|---|---|---|---|---|---|---|
| RAB 136 HCl | 66.4 | 10 | 10 | 542±60 | 446±41 | 90 | 100 | 0 |
|  | 66.4 | 10 | 10 | 616±45 | *370±61 | 90 | 0 | 0 |
|  | 66.4 | 10 | 40 | 512±46 | +428±37 | 20 | 0 | 0 |

*P<0.05 for absolute change compared to control mice (Table 12).
+No statistical analysis.

TABLE 11

Effect of Oral Pretreatment on the Incidence of Ventricular Fibrillation Following Chloroform Inhalation in Fasted Female Mice

| Compound | Dose LD 0.1 (mg./kg.) | No. of mice | Mins. after dosing | Heart rate, b.p.m.±S.E. Before | Heart rate, b.p.m.±S.E. After | Protection from vent. fibrillation (percent) | Toxicity at time of chloroform inhalation Percent ataxic | Toxicity at time of chloroform inhalation Percent other toxicity |
|---|---|---|---|---|---|---|---|---|
| RAB 138 HCl | 67.6 | 10 | 5 | 436±40 | 478±48 | 80 | 100 | 0 |
|  | 67.6 | 10 | 10 | 472±47 | 266±44 | 60 | 100 | 0 |
|  | 67.6 | 10 | 20 | 588±58 | 504±38 | 20 | 0 | 0 |

TABLE 12

Effect of Oral Pretreatment on the Incidence of Ventricular Fibrillation Following Chloroform Inhalation in Fasted Female Mice

| Compound | Dose LD 0.1 (mg./kg.) | No. of mice | Mins. after dosing | Heart rate, b.p.m.±S.E. Before | Heart rate, b.p.m.±S.E. After | Protection from vent. fibrillation (percent) | Toxicity at time of chloroform inhalation Percent ataxic | Toxicity at time of chloroform inhalation Percent other toxicity |
|---|---|---|---|---|---|---|---|---|
| $H_2O$ | 0.5 | 10 | 5 | 528±71 | 670±30 | 0 | 0 | 0 |
|  | 0.5 | 10 | 10 | 608±47 | 548±30 | 0 | 0 | 0 |
|  | 0.5 | 10 | 20 | 626±41 | 536±37 | 0 | 0 | 0 |

The following examples illustrate the preparation of several compounds according to the invention. These examples are not intended to limit the scope of the invention in any way.

EXAMPLE V

Quinuclidine-2-carboxylic acid o-toluidide

A mixture of 4.5 g. of methyl quinuclidine-2-carboxylate, 2.9 g. of o-toluidine and 0.1 g. of sodium was heated at 140°C. for 5 hours. The reaction mixture was then treated with water and ether, the separated water layer extracted twice with ether and the combined ether solutions extracted with dilute hydrochloric acid. The acid extracts were made strongly alkaline and the precipitated crystalline base recrystallized from aqueous alcohol. Yield 2.1 g., m.p. 115.5°–7°C.

$C_{15}H_{20}N_2O$

Calc.: C 73.77%, H 8.25%, N 11.47%
Found: C 73.4%, H 8.21%, N 11.6%

EXAMPLE VI

Quinuclidine-2-carboxylic acid o-chloroanilide

By the same method as described in Example V but replacing the o-toluidine with 3.5 g. of o-chloroaniline and heating for 15 hours quinuclidine-2-carboxylic acid o-chloroanilide was prepared. Yield 2.6 g., m.p. 117-9.5°C. (from 60 percent aqueous alcohol).

$C_{14}H_{17}N_2OCl$

Calc.: C 63.5%, H 6.47%, N 10.58%, Cl 13.39%
Found: C 63.3%, H 6.55%, N 10.5%, Cl 13.4%

EXAMPLE VII

Quinuclidine-2-carboxylic acid 2, 6-xylidide

A mixture of 2.42 g. 2,6-xylidine in 15 ml. of ether was added dropwise to a solution of methylmagnesiumiodide prepared from 0.49 g. of magnesium turnings and 2.84 g. of methyliodide in 20 ml. of ether. Thereupon 1.69 g. of methyl quinuclidine-2-carboxylate in 10 ml. of ether were added and the mixture refluxed for 3 hours. The reaction mixture was then treated with dilute hydrochloric acid, the aqueous phase separated and the pH adjusted to 5.7. After extraction with ether (the extract, containing unreacted xylidine, was discarded) the solution was made strongly alkaline and the precipitated base extracted with ether. After drying over potassium carbonate the base was converted to hydrochloride, which was recrystallized from ethanol-diisopropylether. Yield 0.85% g., m.p. 223°–5°C.

$C_{16}H_{22}N_2O \times HCl$

Calc.: C 65.18%, H 7.86%, N 9.50%
Found: C 65.4%, H 7.89%, N 9.68%

EXAMPLE VIII

Quinuclidine-2-carboxylic acid 2-methyl-6-ethylanilide

The anhydride of quinuclidine-2-carboxylic acid hydrochloride was prepared by the method H. Rinderknecht (Helv. Chim. Acta 47 (1964), 162). The suspension obtained by mixing 3.85 g. of quinuclidine-2-carboxylic acid hydrochloride and 2.0 g. of triethylamine in 40 ml. of chloroform was treated dropwise with a solution of 1.0 g. phosgene in 10 ml. of toluene. The mixture was left at room temperature over night and then a solution of 2.7 g. of 2-methyl-6-ethylaniline in 25 ml. of benzene was added. After reflux for 2 hours the mixture was extracted three times with water and the acid aqueous extracts subjected to the same procedure as described in Example VII. There was obtained 1.2 g. of hydrochloride with m.p. 203°–8°C. Recrystallization from methyl propylketone raised the melting point to 209°–11.5°C.

$C_{17}H_{24}N_2O \times HCl$

Calc: C 66.11%, H 8.16%, N 9.07% Cl 11.48%
Found: C 65.9%, H 8.14%, N 9.07%, Cl 11.5%

EXAMPLE IX

Quinuclidine-2-carboxylic acid 2,6-diethylanilide

This anilide was prepared in the same way as described in Example VIII from the anhydride and 2,6-diethylaniline. Hydrochloride m.p. 209.5°–11.5°C. (from acetonitrile).

$C_{18}H_{26}N_2O \times HCl$

Calc.: C 66.96%, H 8.43%, N 8.68% Cl 10.97%
Found: C 66.7%, H 8.20%, N 8.66%, Cl 11.1%

EXAMPLE X

Quinuclidine-2-carboxylic acid o-chloroanilide

A mixture of 1.9 g. of quinulcidine-3-carboxylic acid hydrochloride and 20 ml. thionylchloride was refluxed for 2.5 hours. Excess thionylchloride was then distilled off using two portions of benzene. The residue was dissolved in 25 ml. of chloroform, whereupon 6.5 g. of o-chloroaniline were added. When the slightly exothermic reaction had subsided, the mixture was refluxed for 1 hour. The precipitated anilinehydrochloride was filtered off by suction, and the filtrate extracted with dilute hydrochloric acid. The pH of the extract was adjusted to 5.5 and excess chloroaniline extracted with ether. The solution was then made alkaline (pH 10). The precipitated base amounted to 1.8 g. with a melting point of 157°–165°C. Two recrystallizations from methyl-isobutylketone raised the melting point to 166.5°–168.5°C.

$C_{14}H_{17}N_2OCl$

Calc.: C 63.51%, H 6.47%, N 10.58%, Cl 13.39%
Found: C 62.5%, H 6.33%, N 10.9%, Cl 13.48%

EXAMPLE XI

Quinuclidine-3-carboxylic acid anilide

Portions of 1.55 g. of quinuclidine-3-carboxylic acid and 2.12 g. of N,N'-diphenylurea were intimately mixed and heated to 210°C. with stirring. The melt obtained was kept at this temperature for 4 hours with continued stirring.

After cooling the brownish black reaction mixture was dissolved in dilute hydrochloric acid. The pH of this solution was adjusted to 5.7 and the solution then washed with ether. It was made strongly alkaline and the precipitated base extracted with ether. The extracts were dried over magnesium sulphate. The filtered ether solution was evaporated somewhat and then cooled, yielding 0.50 g. of product with a melting point of 177°–179.5°C. Recrystallization from methyl-isobutylketone raised the melting point to 178°–180°C.

$C_{14}H_{18}N_2O$

Calc. m.w.: 230.3
Found: 232.7

EXAMPLE XII

Injectable solution containing quinuclidine-2-carboxylic acid 2-methyl-6-ethylanilide To 100 ml. of hot, sterilized water 0.0 g. of methyl p-hydroxybenzoate was added while stirring and heating. When all benzoate had been dissolved 2 g. of quinuclidine-2-carboxylic acid 2-methyl-6-ethylanilide hydrochloride and 0.6 g. of sodium chloride were added while stirring. The pH was adjusted to 7 by adding sodium hydroxide. Sterilized water was added to 100 ml.

EXAMPLE XIII

Injectible solution containing quinuclidine-2-carboxylic acid 2-methyl-6-ethylanilide and vasoconstrictor To 100 ml. of hot, sterilized water 0.1 g. of methyl p-hydroxybenzoate, 2 g. of quinuclidine-2-carboxylic acid 2-methyl-6-ethylanilide hydrochloride and 0.6 g. of sodium chloride were added tin the same way as described in Example XII, but the solution was protected from air-oxygen by working in nitrogen atmosphere. 0.05 g. of sodium pyrosulphite was then dissolved, whereafter 1 mg. of adrenaline was added. pH was adjusted to 4 by adding sodium hydroxide. Sterilized water was added to 100 ml.

We claim:

1. A method for treating arrhythmia in animals including man which comprises administering to said animals a therapeutically effective dose for treating arrhythmia of a pharmaceutically acceptable compound selected from the group consisting of antilides having the formula

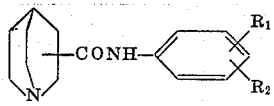

wherein the carbon atom C is attached to the quinuclidine radical in the 2- or 3-position, and $R_1$ and $R_2$ represent radicals selected from the group consisting of hydrogen, chlorine, and alkyl having at most three carbon atoms, and therapeutically acceptable salts thereof.

2. A method according to claim 1 where the carbon atom C is attached to the quinuclidine radical in the 2-position.

3. A method according to claim 1 wherein the substituents $R_1$ and $R_2$ are in the 2- and 6-positions.

4. A pharmaceutical preparation comprising, as an active ingredient a therapeutically effective dose for treating arrhythmia of, an anilide compound selected from the group consisting of compounds having the formula

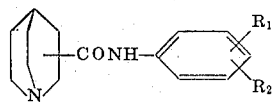

wherein the carbon atom C is attached to the quinuclidine radical in the 2- or 3-position, and $R_1$ and $R_2$ represent radicals selected from the group consisting of hydrogen, chlorine, and alkyl having at most three carbon atoms, and therapeutically acceptable salts thereof, in association with a pharmaceutically acceptable carrier.

5. A pharmaceutical preparation according to claim 4 wherein the carbon atom C is attached to the quinuclidine radical in the 2-position.

6. A pharmaceutical preparation according to claim 4 wherein the substances $R_1$ and $R_2$ are in the 2- and 6-positions.

7. A pharmaceutical preparation according to claim 4 wherein the active ingredient is quinuclidine-2-carboxylic acid o-toludide or a therapeutically acceptable salt thereof.

8. A pharmaceutical preparation according to claim 4 wherein the active ingredient is quinuclidine-2-carboxylic acid 2,6-xylidide or a therapeutically acceptable salt thereof.

9. A pharmaceutical preparation according to claim 4 wherein the active ingredient is quinuclidine-2-carboxylic acid 2-methyl-6-ethylanilide or a therapeutically acceptable salt thereof.

10. A pharmaceutical preparation according to claim 4 wherein the active ingredient is quinuclidine-2-carboxylic acid 2,6-diethylanilide or a therapeutically acceptable salt thereof.

11. A pharmaceutical preparation comprising as an active ingredient about 0.1 percent – 85 percent by weight of the preparation of an anilide compound selected from the group consisting of compounds having the formula

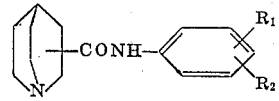

wherein the carbon atom C is attached to the quinuclidine radical in the 2- or 3- position, and $R_1$ and $R_2$ represent radicals selected from the group consisting of hydrogen, chlorine, and alkyl having at most three carbon atoms, and therapeutically acceptable salts thereof in association with a pharmaceutically acceptable carrier.

12. A pharmaceutical preparation according to claim 11 which is in a form suitable for peroral administration and wherein the active ingredient comprises between about 2 percent to 50 percent by weight of the preparation.

13. A pharmaceutical preparation according to claim 11 which is in a form suitable for parenteral administration and wherein the active ingredient comprises between about 0.5 percent to 5 percent by weight of the preparation.

* * * * *